United States Patent [15] 3,666,880
Krause [45] May 30, 1972

[54] CIRCUIT ARRANGEMENT FOR THE CORRECTION OF TIME ERRORS IN ELECTRICAL SIGNALS RECEIVED FROM AN INFORMATION CARRIER

[72] Inventor: Gerhard Krause, Darmstadt, Germany

[73] Assignee: Fernseh GmbH, Darmstadt, Germany

[22] Filed: Apr. 25, 1969

[21] Appl. No.: 819,177

[30] Foreign Application Priority Data

May 20, 1968 Germany ....................P 17 74 302.1

[52] U.S. Cl. ...............178/5.2 R, 178/69.5 DC, 178/6.6 TC, 179/15 BA

[51] Int. Cl. ...............................................H04n 9/02

[58] Field of Search ...............178/5.4 CR, 69.5 DC, 6.6 TC, 178/69.5 TV5.2; 179/15 BS, 15 BA

[56] References Cited

UNITED STATES PATENTS

| | | | |
|---|---|---|---|
| 3,100,816 | 8/1963 | Coleman et al. | 178/5.4 CB |
| 3,384,707 | 5/1968 | Bopp et al. | 178/69.5 DC |
| 3,428,745 | 2/1969 | Coleman et al. | 178/5.4 CR |
| 3,227,811 | 1/1966 | Hart et al. | 178/15 BA |
| 2,965,711 | 12/1960 | James et al. | 178/6.6 TC |
| 3,419,681 | 12/1968 | Bopp et al. | 178/6.6 TC |

*Primary Examiner*—Robert L. Richardson
*Assistant Examiner*—Richard P. Lange
*Attorney*—Ernest F. Marmorek

[57] ABSTRACT

In a color TV system preferably using a tape for storing information carrying signals, which signals are color TV signals, a circuit for correcting time errors in the signals removed from said information storing means, comprising storage means, means for producing read-in pulses from the color burst of the TV signals, the read-in pulses containing said time errors, switch means connecting the read-in pulse producing means to the storage means for inserting the instantaneous value of the information carrying signals into the storage means at the rate of the read-in pulses, means for producing read-out pulses from a reference signal which is free from such time errors, switch means connecting the read-out pulse producing means to the storage means for reading out the information in the storage means at the rate of the read-out pulses and output means for receiving the time-error free information containing signals.

10 Claims, 3 Drawing Figures

Inventor:
Gerhard Krause, by
His Attorney.

CIRCUIT ARRANGEMENT FOR THE CORRECTION OF TIME ERRORS IN ELECTRICAL SIGNALS RECEIVED FROM AN INFORMATION CARRIER

The present invention relates to a circuit arrangement for the time correction of electrical signals which have been received from an information carrying device.

Notwithstanding the fact that TV as well as data recording devices possess nowadays excellent mechanical properties and accuracy and the fact that high requirements are posed to the accurate controlling of the tape advancing and driving gears in such apparatus, it remains still practically impossible to reproduce signals which would be free from all kinds of time errors. Such time errors are especially disturbing when color TV signals are to be reproduced since such errors cause considerable color distortions.

There are already methods known for correcting time errors in signals which are received from a magnetic storage device, such as a tape, according to one of which the signal is passed over a controlled transit-time type or lump constant-type delay network. Such delay network consists of a large number of L-C low pass members in which the capacitances are represented by semiconductor diodes, the capacitance of which changes in accordance with the applied DC voltage. The transit time of such controlled delay network can be varied only in terms of a fraction of the overall transit time of the network. Therefore, by employing the above-described method, it becomes necessary to delay the signal much more than it would be necessary for the correction of the time errors.

According to another known method which does not possess the above-described shortcomings, the signal is passed through a tapped lump constant type delay network. The signal is fed to the delay network at a selected tap according to the time error present, then from such tap point the TV signal is further conducted down the delay line. This method, however, it too complex in view of the fact that the delay line should be tapped and that the steps between the tappings are relatively large, which circumstance permits only a coarse correction of the time errors. By using this method it will be necessary to use additional time correcting stages having smaller tapping stages or an additional controlled delay line in order to provide for the fine time correction of the signal.

It is, therefore, an object of the present invention to provide a circuit arrangement for the time correction of signals which are removed from a preferably tape-type magnetic storage device and, which requires a less complex circuit arrangement than the heretofore known time correcting devices and at the same time introduces only a relatively small constant additional delay into the signal.

In accordance with the invention, the circuit arrangement for time correcting the signals received from an information carrier comprises storage devices into which the instantaneous values of the signals containing the time errors are read-in at a predetermined rate and means for interrogating the information stored in such storage devices at a predetermined rate of interrogating pulses, and in which the read-in pulses are derived from the signal containing the time errors, whereas the read-out or interrogating pulses are derived from a reference signal free from the time errors.

The invention will become more readily apparent from the following description of preferred embodiments thereof shown in the accompanying drawing, in which.

In the figures similar elements or blocks are identified by the same reference numerals.

Figure 1:
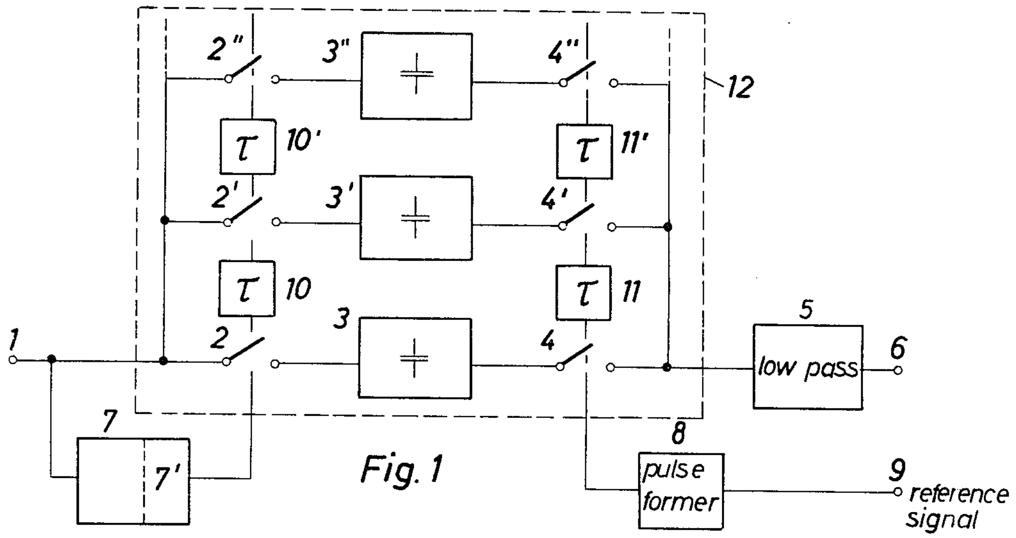
FIG. 1 is a schematic showing of the time correcting circuit arrangement according to the invention.

Referring to FIG. 1 it is seen that the signal containing the time errors is received at terminal 1 of the circuit arrangement 12, while at terminal 9 the reference signal which is free from time errors is received for purposes hereinafter described. The signal containing the time errors and the reference signal which is free from the time errors are synchronized with respect to their frequencies. A time error becomes apparent in that the signal appearing at terminal 1 experiences a phase distortion with respect to its desired value. A device 7 is connected with its input terminal to terminal 1 and derives read-in pulses from the input signal containing the time errors. Device 7 may comprise, for example,an amplitude discriminator and a pulse-forming circuit. The other terminal, which is the output terminal of device 7, is connected through a switch 2 to circuit 12 in a manner hereinafter described. Switch 2 is preferably an electric switching device. By closing switch 2, operated as hereinafter described, for a short period of time, an instantaneous value of the signal becomes fed into storage device 3. Storage device 3 is preferably a capacitive device and, as shown in the illustrated embodiment, may comprise a plurality of parallel connected capacitive devices 3, 3′, 3″, each being connected through a respective switching branch of switch 2, such as 2′, and 2″ for feeding thereinto the input signal containing the time error. It is understood that switching devices 2, 2′ and 2″ are only schematically shown to possess the switching arms illustrated. In the preferred embodiment the switching devices are pulse-operated electronic switching elements. The reference signal fed into the circuit at terminal 9 passes through a pulse-forming device 8, which produces the read-out pulses. The preferred types of reference signals will be described hereinafter. The read-out pulses control a switching device 4 operated as hereinafter described which, when closed, reads out the information from the single or plurality of storage devices 3—3″ and passes it into low-pass filter 5. Switching device 4, similarly to switching device 2, contains as many switching branches illustratively shown as arams as switch 2 and the number of storage devices 3 present in circuit 12. The read-out signal is freed in filter 5 from its high frequency components, which may have been generated by the read-in and read-out process so that a signal free from time errors is available at output terminal 6 of the circuit arrangement 12. If in the circuit arrangement 12 only a single storage device 3 and only a single read-in switch 2 and a single read-out switch 4 is used, it becomes necessary that the read-in and read-out frequencies be selected to accomodate twice the highest frequency present in the signal to be transmitted. Under this condition the device 7 may contain a frequency multiplier device 7′. In a circuit arrangement containing only a single storage device 3, the value of the highest correctable time error is approximately equal to a period of the read-in or read-out frequency, which in turn corresponds to a half-period of the highest frequency in the transmitted signal.

In order to enable correction of larger time errors, it becomes necessary to use more and more storage devices in a parallel arrangement as shown in the illustrated embodiment of FIG. 1 by storage devices 3, 3′, and 3″. As also seen in FIG. 1, each of such storage devices has associated therewith a set of read-in switches 2, 2′ and 2″, as well as a set of read-out switches 4, 4′ and 4″. Of course, the number of the storage devices is not limited to three as shown in the embodiment of FIG. 1 for illustrative purposes.

By employing more than a single storage device 3, the read-in and read-out pulses control always the first set of the switches, that is, switches 2 and 4. The remaining switches 2′, 2″ and 4′, 4″ are controlled by the input signal 2 through delay networks 10, 10′ and 11, 11′, respectively. This delay networks delay the read-in and the read-out pulses by a fraction of the pulse period corresponding to the number of the storage devices present. As a result, the smallest possible frequency of the read-in or read-out pulses is reduced by a similar amount.

Figure 2:
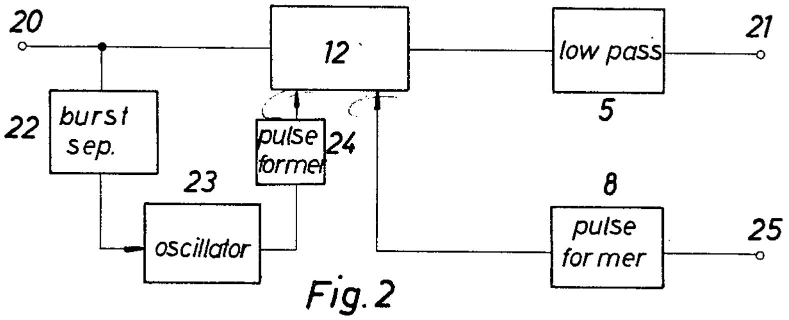
FIG. 2 is a block diagram showing the fine or color correcting arrangement according to the invention as applied to the circuits of a color TV tape recorder.

With reference to FIG. 2, it is seen that the color TV signal containing the time errors is fed into the circuit at terminal 20.

The arrangement identified by the reference numeral 12 corresponds to the circuit arrangement identified by the reference numeral 12 and shown in detail in FIG. 1. From the output of device 12, the signal, similarly as in the circuit arrangement of FIG. 1, is passed through a low pass filter 5 before it reaches the output terminal 21. For low-pass filter 5 the same can be used which is present anyway in the magnetic recording devices using carrier frequency recording. In device 22 the color burst is separated from the color TV signal in a known manner. The color burst derived here is fed into oscillator 23, which can be in the form of a start-stop oscillator, and which produces a color carrier which is synchronized by the color burst on each line. This color carrier is similarly to the color burst and to the color TV signal contains the similar time errors. A pulse-forming device 24 produces pulses from the color carrier which will drive or control switches 2 and, after an appropriate delay, switches 2 and 2'', as shown in FIG. 1 and as mentioned above. At terminal 25 a reference color carrier is fed to the circuit which is free from the time errors. From this reference color carrier a pulse former 8 produces short pulses which then drive switch 4 and, after appropriate delay, switches 4' and 4'' as shown in FIG. 1.

The circuit arrangement according to FIG. 2 is especially adapted to perform the so-called automatic or color time correction in color TV tape recorders. However, in order to perform a total time correction, including also coarse time correction, it becomes necessary that a phase comparison be performed with respect to the line synchronizing pulses. The latter operation becomes possible by the use of a circuit arrangement according to FIG. 3.

Figure 3:
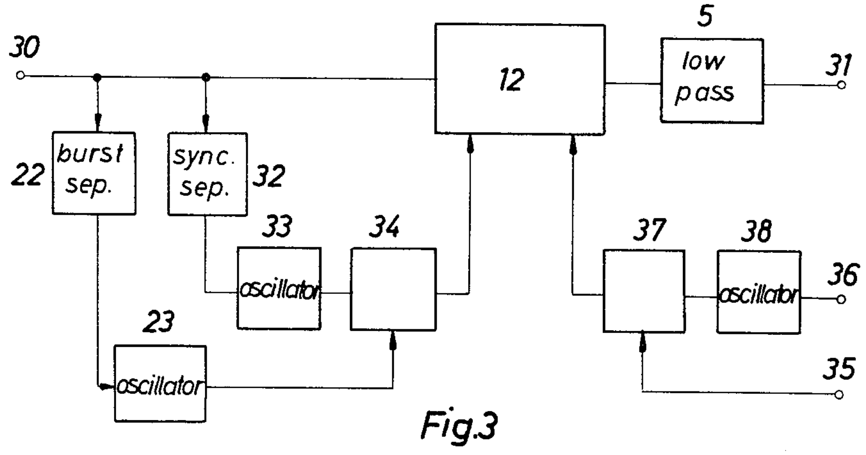
FIG. 3 is a block diagram illustrating the application of the time correcting circuit arrangement as applied to correct the total time errors in color TV signals received from a magnetic tape.

With reference to FIG. 3, the color TV signal is fed into the circuit at terminal 30 and, similarly as in FIG. 2, it is freed from its color burst in device 22. Oscillator 23 produces from the color burst a color carrier which contains the time errors as well. In addition, the horizontal synchronizing pulse is filtered out in device 32 from the color TV signal. This horizontal synchronizing pulse synchronizes an oscillator 33 which produces pulses of approximately 1MHz frequency rate. These pulses are fed into device 34, which performs a fine synchronization of the pulse edges. Device 34 may consist, for example, of a bi-stable multivibrator which is thrown into one of its stable states by the 1MHz pulses and into its other stable state by the color carrier containing the time errors. The pulse resulting from the return or fly back of the multi-vibrator is fed into the circuit arrangement 12 to operate switches 2, 2', and 2''.

In the circuit arrangement according to FIG. 3, the reference signals free from the time error consist of a reference color carrier fed into terminal 35 and a comparing pulse having a frequency equal to the horizontal frequency is fed into terminal 36. The latter signals synchronize an oscillator 38 which is similarly constructed as oscillator 33. Oscillator 38 produces also a square pulse having a frequency of 1MHz. The output of oscillator 38 is fed into a device 37 similarly constructed as device 34 for fine synchronization purposes. The pulses produced by device 37 are free from time errors and are fed into circuit 12 to control switches 4, 4' and 4''.

While the invention has been described in connection with only specific embodiments thereof, it will be readily apparent that numerous modifications thereof may readily be made. It is, therefore, intended by the appended claims to cover all such modifications and variations as come within the true spirit and scope of the invention.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a system including means for deriving color television information carrying signals, a circuit for correcting time errors in said signals removed from said information deriving means, comprising storage means, means for producing read-in pulses from the color burst and the horizontal synchronizing signals of said information carrying signals said read-in pulses containing said time errors, means connecting said read-in pulse producing means to said storage means for inserting the instantaneous value of said information carrying signals into said storage means at the rate of said read-in pulses, said storage means storing said instantaneous value of said information carrying signal for a period corresponding to not more than one half the period of the highest transmitted signal frequency, means for producing read-out pulses from a reference signal free from said time errors, means connecting said read-out pulse producing means to said storage means for reading out said information in said storage means at the rate of said read-out pulses, and output means for receiving time-error free information containing signals, wherein the frequency of said read-in and of said read-out pulses is at least of the magnitude corresponding to twice the highest frequency value of the said information carrying signals, the frequencies of said read-in pulses being synchronized with said color burst and said horizontal synchronizing signal and the read-out pulses being synchronized with said reference signal.

2. The combination as claimed in claim 1, including first switch means connected between said storage means and said read-in pulse producing means, said read-in pulses controlling the operation of said switch means, second switch means connected between said read-out pulse producing means and said storage device, said read-out pulses controlling said second switch means.

3. The combination as claimed in claim 2, wherein said storage means is a single capacitive type storage device.

4. The combination as claimed in claim 2, wherein said storage means comprises a plurality of capacitive type storage devices connected in parallel circuit relationship with each other, said first switch means and said second switch means comprising a plurality of switches corresponding in number to the number of said plurality of storage devices.

5. The combination as claimed in claim 2, wherein said switch means comprises an electronic switching device.

6. The combination as claimed in claim 4, including delay means connected between adjacent ones of said plurality of switches in said first and in said second switch means, each of said delay means delaying said read-in and read-out signals by a predetermined increment of said read-in and read-out frequency.

7. The combination as claimed in claim 1, wherein said read-out pulses are derived from a reference color carrier and from a comparing signal having a frequency corresponding to the horizontal frequency of said color television signal.

8. The combination as claimed in claim 7, including means for producing an auxiliary signal from each of said horizontal synchronizing signals and from said comparing signal, the frequency of said auxiliary signal having a magnitude multiple the magnitude of the line frequency of said color television signal, said read-in and read-out pulses being produced from the respective ones of said auxiliary signals and, means for correcting the phase of said read-in pulses by said color carrier containing said time errors and, means for correcting the phase of said read-out signals by said reference color carrier.

9. The combination as claimed in claim 8, wherein each of said phase correcting means comprises a bistable multivibrator having two stable states, said color carrier containing said time errors transferring said multivibrator into one of said stable states, wherein said read-in pulse is produced by said multivibrator, said reference color carrier transferring said multivibrator into the other of said stable states thereof, wherein said read-out pulse is produced.

10. The combination as claimed in claim 1, wherein said information storing means is a tape.

* * * * *